(12) United States Patent
Yamaguchi

(10) Patent No.: US 10,174,196 B2
(45) Date of Patent: *Jan. 8, 2019

(54) RESIN COMPOSITION AND MOLDED ARTICLE

(71) Applicant: ASAHI KASEI KABUSHIKI KAISHA, Tokyo (JP)

(72) Inventor: Toru Yamaguchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,583

(22) Filed: Jul. 17, 2017

(65) Prior Publication Data

US 2017/0313877 A1 Nov. 2, 2017

Related U.S. Application Data

(60) Continuation of application No. 15/380,103, filed on Dec. 15, 2016, which is a division of application No.
(Continued)

(30) Foreign Application Priority Data

Apr. 17, 2013 (JP) .................................. 2013-086736

(51) Int. Cl.
*C08L 71/12* (2006.01)
*C08L 91/00* (2006.01)
(Continued)

(52) U.S. Cl.
CPC ............... *C08L 71/123* (2013.01); *C08J 5/00* (2013.01); *C08L 71/12* (2013.01); *C08L 91/00* (2013.01);
(Continued)

(58) Field of Classification Search
CPC . C08L 2205/03; C08J 2371/12; C08J 2425/06
See application file for complete search history.

(56) References Cited

U.S. PATENT DOCUMENTS 3,787,532 A * 1/1974 Carmelite et al. .... C08F 279/02
524/508
4,742,115 A 5/1988 Mawatari et al.
(Continued)

FOREIGN PATENT DOCUMENTS

EP 0260552 A2 3/1998
JP 61-111354 5/1986
(Continued)

OTHER PUBLICATIONS

International Search Report issued with respect to application No. PCT/JP2014/060744, dated Jul. 1, 2014 and translations thereof.
(Continued)

*Primary Examiner* — Mark S Kaucher
(74) *Attorney, Agent, or Firm* — Greenblum & Bernstein, P.L.C.

(57) ABSTRACT

A resin composition contains: 60 to 95% by mass of polyphenylene ether (A); 35 to 0% by mass of styrene-based resin (B); and 15 to 5% by mass of elastomer component (C). The component (C) is present as dispersion particles in the resin composition. The dispersion particles have a number average particle size of 0.04 to 0.25 μm.

9 Claims, 3 Drawing Sheets

Related U.S. Application Data

14/783,122, filed as application No. PCT/JP2014/060744 on Apr. 15, 2014, now Pat. No. 9,617,419.

(51) Int. Cl.
| | | |
|---|---|---|
| *C08J 5/00* | (2006.01) | |
| *C08L 25/06* | (2006.01) | |
| *F21S 41/37* | (2018.01) | |
| *F21S 41/50* | (2018.01) | |

(52) U.S. Cl.
CPC ........ *C08J 2371/12* (2013.01); *C08J 2409/06* (2013.01); *C08J 2425/06* (2013.01); *C08L 25/06* (2013.01); *C08L 2201/02* (2013.01); *C08L 2205/03* (2013.01); *F21S 41/37* (2018.01); *F21S 41/50* (2018.01)

(56) References Cited

U.S. PATENT DOCUMENTS

| | | | |
|---|---|---|---|
| 5,082,732 A | 1/1992 | Ueda et al. | |
| 2004/0235993 A1* | 11/2004 | Yoshida | C08K 5/523 524/115 |
| 2007/0060677 A1 | 3/2007 | Yoshida et al. | |
| 2011/0003101 A1* | 1/2011 | Fuji | G02B 1/041 428/35.7 |
| 2012/0071599 A1* | 3/2012 | Yamaguchi | C08L 71/02 524/166 |
| 2012/0214929 A1 | 8/2012 | Fishburn et al. | |
| 2016/0053114 A1 | 2/2016 | Yamaguchi | |

FOREIGN PATENT DOCUMENTS

| | | |
|---|---|---|
| JP | 63-301222 A | 12/1988 |
| JP | 01-297428 | 11/1989 |
| JP | 02001760 A | 1/1990 |
| JP | 08151491 A | 6/1996 |
| JP | 2007-023078 A1 | 2/2007 |
| JP | 2009197196 A | 9/2009 |
| JP | 2012153832 A | 8/2012 |
| JP | 2013040288 A | 2/2013 |
| JP | 2013-213132 A | 10/2013 |
| WO | 2005/030872 A1 | 4/2005 |
| WO | 2009/125623 A1 | 10/2009 |
| WO | 2010/134608 A1 | 11/2010 |
| WO | 2012/070592 A1 | 5/2012 |

OTHER PUBLICATIONS

International Preliminary Report on Patentability issued with respect to application No. PCT/JP2014/060744, dated Mar. 24, 2015 and translations thereof.

European Search Report issued with respect to application No. EP14785770.0, dated Feb. 4, 2016 and translations thereof.

* cited by examiner

[Figure 1]
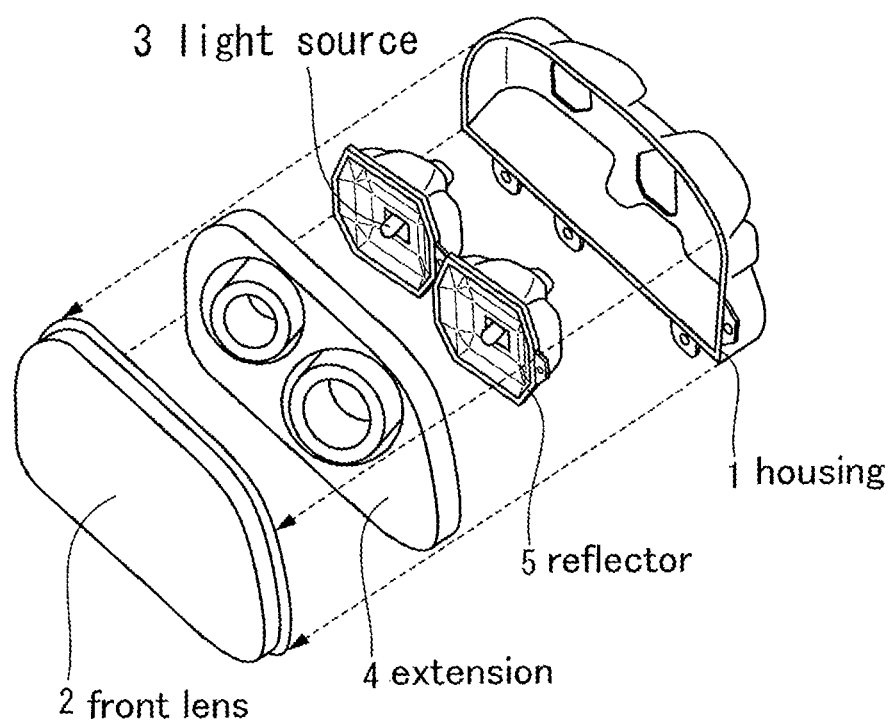

[Figure 2]
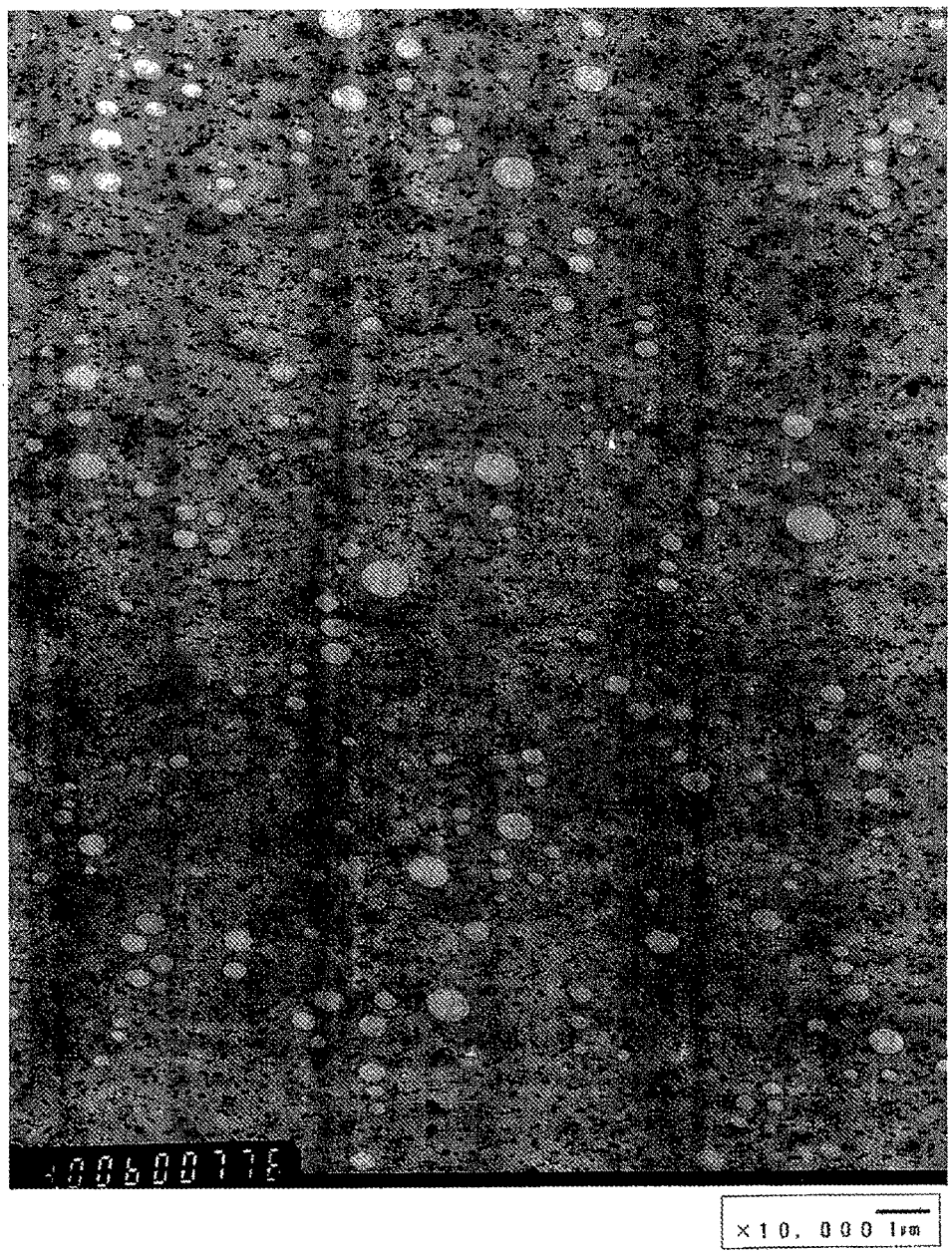

[Figure 3]
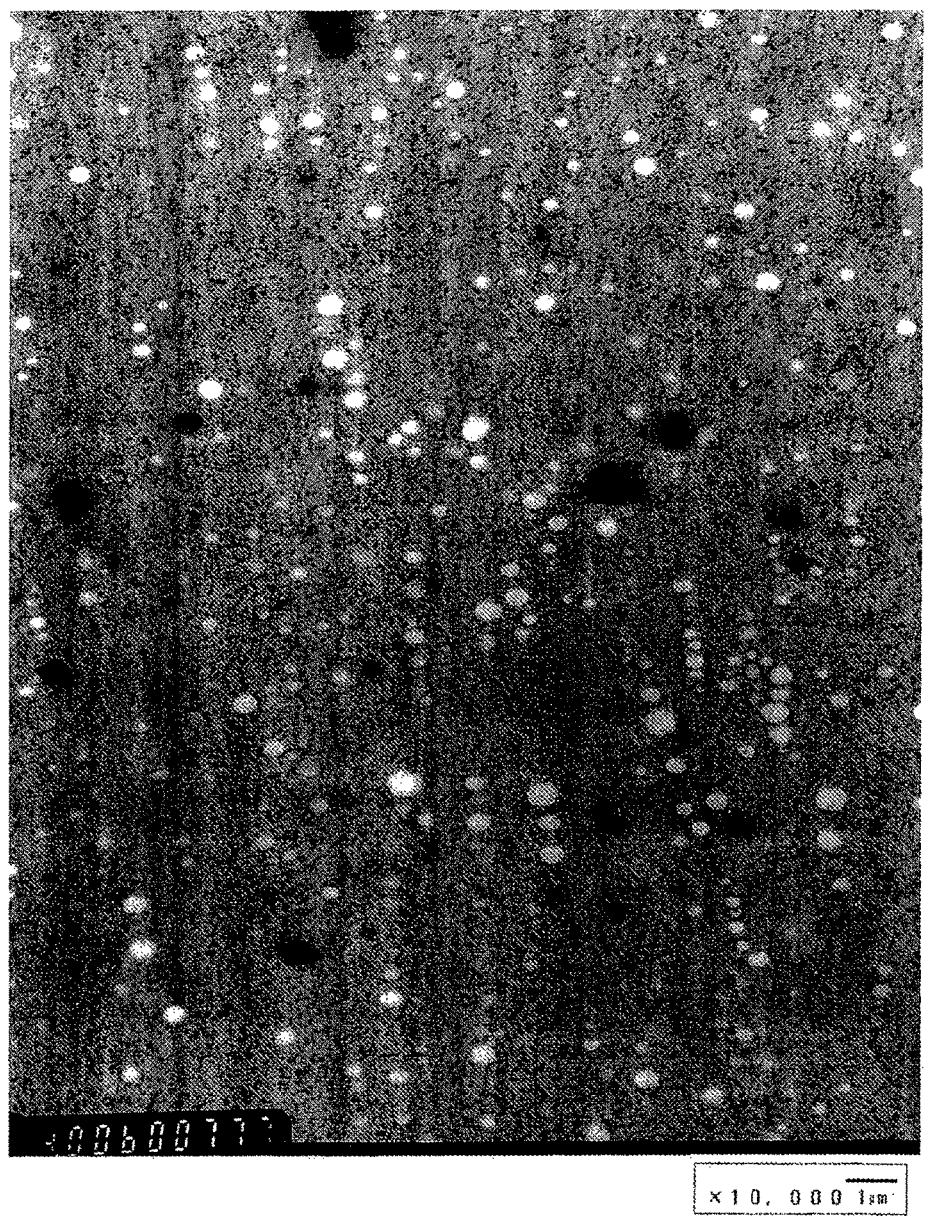

RESIN COMPOSITION AND MOLDED ARTICLE

CROSS-REFERENCE TO RELATED APPLICATIONS

This is a Continuation Application of U.S. application Ser. No. 15/380,103, field Dec. 15, 2016, which is a Divisional Application of U.S. application Ser. No. 14/783,122, filed Oct. 8, 2015, which is a National Stage of the International Application No. PCT/JP2014/060744, filed Apr. 15, 2014, which claims priority to Japanese Application No. 2013-086736, filed Apr. 17, 2013. The disclosure of application Ser. Nos. 14/783,122, 15/380,103, and PCT/JP2014/060744 are expressly incorporated by reference herein in their entireties.

TECHNICAL FIELD

The present invention relates to a resin composition and a molded article.

BACKGROUND ART

Polyphenylene ether resins are excellent in mechanical physical properties, electric properties, acid resistance, alkali resistance and heat resistance, and simultaneously have various properties such as low specific gravities, low water absorption rates and good dimensional stability. Therefore, heretofore, the polyphenylene ether resins are broadly used as materials for household appliances, OA devices, business machines, information devices and automobiles and the like.

Particularly in the applications to light-reflecting molded articles and the like requiring high heat resistance, the demand for resin compositions designed in a higher ratio of the content of a polyphenylene ether resin is anticipated. Such applications also require good appearance properties in addition to high heat resistance. Furthermore, the applications require good molding fluidity and practically sufficient impact resistance.

Heretofore, a method for adding rubber-reinforced polystyrene (high impact polystyrene) and an elastomer component is used in order to apply practically sufficient impact resistance to the polyphenylene ether resin.

However, the method for adding rubber-reinforced polystyrene has problems that it tends to decrease the fluidity of a resin composition and remarkably impairs the brightness feeling of the appearance of a molded article.

On the other hand, a technique for using high-molecular weight SEBS (hydrogenated styrene-based elastomer) and SEBS having a high bound styrene content in combination is proposed for the method for adding an elastomer component (for example, see Patent Literature 1).

A technique for using an ethylene-based elastomer component and SEES having a high bound styrene content in combination is also disclosed (for example, see Patent Literature 2).

CITATION LIST

Patent Literature

Patent Literature 1: Japanese Patent Laid-Open No. 2009-197196
Patent Literature 2: Japanese Patent Laid-Open No. H08 (1996)-151491

SUMMARY OF INVENTION

Technical Problem

However, the resin compositions manufactured by the methods described in Patent Literatures 1 and 2 have a problem that the resin compositions do not yet sufficiently have good properties as a practical molding material.

Then, in the present invention, in consideration of the above-mentioned problems in the related art, it is an object of the present invention to provide a resin composition providing a molded article having excellent impact resistance, and being capable of effectively preventing the delamination of a molded body, and a molded article thereof.

Solution to Problem

As a result of diligent research to resolve the problems, the present inventors focused attention on the dispersion state of an elastomer component having a remarkable effect on the physical properties of a resin composition, and considered the impact resistance and delamination prevention of a molded article of the resin composition. As a result, the present inventors discovered that the problems could be resolved by adjusting the dispersion state of the elastomer component in a resin composition containing 60 to 95% by mass of a polyphenylene ether, 35 to 0% by mass of a styrene-based resin, and 15 to 5% by mass of an elastomer component, that is, containing a polyphenylene ether in a comparatively high concentration, thereby completing the present invention.

Specifically, the present invention is as follows.

[1]

A resin composition comprising:

60 to 95% by mass of polyphenylene ether (A);

35 to 0% by mass of styrene-based resin (B); and 15 to 5% by mass of elastomer component (C), wherein the component (C) is present as dispersion particles in the resin composition; and the dispersion particles have a number average particle size of 0.04 to 0.25 μm.

[2]

The resin composition according to [1] comprising:

60 to 95% by mass of polyphenylene ether (A);

35 to 0% by mass of styrene-based resin (B); and 15 to 5% by mass of elastomer component (C), wherein the elastomer component (C) is present as dispersion particles in the resin composition; and the dispersion particles have a number average particle size of 0.04 to 0.25 μm; and the dispersion particles having a particle size of greater than 1.0 μm are not present and the number of the dispersion particles having a particle size of 0.5 to 1.0 μm is 3 or less in an area corresponding to an actual measured value of 396 μm$^2$ by transmission electron microscopy.

[3]

The resin composition according to [1] or [2], wherein the elastomer component (C) comprises an oil-extended styrene block-hydrogenated conjugated diene compound block copolymer.

[4]

The resin composition according to any one of [1] to [3], wherein the elastomer component (C) comprises an oil-extended styrene block-hydrogenated conjugated diene compound block copolymer having an oil-extended amount of 20 to 50% by mass.

[5]

The resin composition according to [3] or [4], wherein the elastomer component (C) comprises the oil-extended styrene block-hydrogenated conjugated diene compound block copolymer having an oil-extended amount of 20 to 50% by mass and an olefin-based elastomer in a mass ratio of (the oil-extended styrene block-hydrogenated conjugated diene compound block copolymer having an oil-extended amount of 20 to 50% by mass: the olefin-based elastomer)=9:1 to 3:7.

[6]

The resin composition according to any one of [3] to [5], wherein the resin composition comprises 15 to 100 parts by mass of an oil based on 100 parts by mass of the styrene block-hydrogenated conjugated diene compound block copolymer.

[7]

The resin composition according to any one of [1] to [6], wherein the component (C) comprises a styrene block-hydrogenated conjugated diene compound block copolymer and/or an oil-extended styrene block-hydrogenated conjugated diene compound block copolymer and an olefin-based elastomer in a mass ratio of (the styrene block-hydrogenated conjugated diene compound block copolymer and/or the oil-extended styrene block-hydrogenated conjugated diene compound block copolymer/the olefin-based elastomer)=9:1 to 3:7, and the resin composition comprises 15 to 100 parts by mass of an oil based on 100 parts by mass of the styrene block-hydrogenated conjugated diene compound block copolymer.

[8]

A molded article for a light-reflecting part comprising the resin composition according to any one of [1] to [7].

[9]

A molded article for an automotive lamp extension comprising the resin composition according to any one of [1] to [7].

ADVANTAGEOUS EFFECT OF INVENTION

The present invention can provide a resin composition providing a molded article having excellent impact resistance and an excellent delamination preventing effect, and a molded article thereof.

BRIEF DESCRIPTION OF DRAWINGS

FIG. 1 shows a schematic view of an automotive lamp including a molded article for an automotive lamp extension of the present embodiment;

FIG. 2 shows an electron microscope photograph of an example of a resin composition in which particles of an elastomer component (a black portion in FIG. 2) are in a dispersion state satisfying following conditions (i) to (ii): (i) a number average particle size is 0.04 to 0.25 µm; (ii) no particles having a particle size of greater than 1.0 µm in an area of 396 µm² are present; and (iii) the number of particles having a particle size of 0.5 to 1.0 µm in an area of 396 µm² is 3 or less. FIG. 3 shows an electron microscope photograph of an example of a resin composition in which particles of an elastomer component (a black portion in FIG. 3) are in a dispersion state not satisfying at least one of following conditions (i) to (iii): (i) a number average particle size is 0.04 to 0.25 µm; (ii) no particles having a particle size of greater than 1.0 µm in an area of 396 µm² are present; and (iii) the number of particles having a particle size of 0.5 to 1.0 µm in an area of 396 µm² is 3 or less.

DESCRIPTION OF EMBODIMENT

Hereinafter, an embodiment for implementing the present invention (hereinafter, referred to as "the present embodiment") will be described in detail. The present invention will not be limited to the description below, but can be modified within the scope of the gist and implemented.

[Resin Composition]

A resin composition of the present embodiment contains: 60 to 95% by mass of polyphenylene ether (A); 35 to 0% by mass of styrene-based resin (B); and 15 to 5% by mass of elastomer component (C).

The elastomer component (C) is present as dispersion particles in the resin composition of the present embodiment; and the dispersion particles have a number average particle size of 0.04 to 0.25 µm.

It is preferable that the component (C) forms a dispersion phase containing the dispersion particles in the resin composition and the dispersion particles having a particle size of greater than 1.0 µm are not present and the number of the dispersion particles having a particle size in a range of 0.5 to 1.0 µm is 3 or less in an area corresponding to 396 µm² as measured by transmission electron microscopy.

The dispersion state of elastomer component (C) in the resin composition of the present embodiment will be described below in detail.

(Polyphenylene Ether (A))

The resin composition of the present embodiment contains polyphenylene ether (A) (herein, may be described as component (A)).

The reduced viscosity of polyphenylene ether (A) is preferably in a range of 0.25 to 0.55 dl/g, more preferably 0.25 to 0.45 dl/g, and still more preferably 0.30 to 0.42 dl/g.

The reduced viscosity of polyphenylene ether (A) is preferably 0.25 dl/g or more from the viewpoint of sufficient mechanical physical properties, and is preferably 0.55 dl/g or less from the viewpoints of molding processability and the brightness feeling of a molded article.

The reduced viscosity of polyphenylene ether (A) can be measured in a 0.5 g/dl solution under a temperature condition of 30° C. using a chloroform solvent.

It is preferable that polyphenylene ether (A) has a repeating unit of following general formula (1) and/or (2), and is a homopolymer or a copolymer including a constitutional unit having general formula (1) or (2).

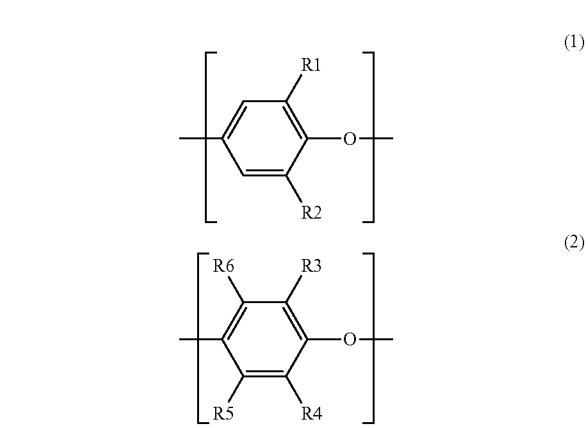

In above general formulae (1) and (2), R1, R2, R3, R4, R5 and R6 are each independently selected from the groups consisting of an alkyl group having 1 to 4 carbon atoms, an aryl group having 6 to 12 carbon atoms, and a monovalent residue such as a halogen or hydrogen. However, the case where R5 and R6 are simultaneously hydrogen is excluded.

The alkyl group preferably has 1 to 3 carbon atoms; the aryl group preferably has 6 to 8 carbon atoms; and the monovalent residue is preferably hydrogen.

The number of the repeating units in general formulae (1) and (2) is not particularly limited because it varies depending on the molecular weight distribution of polyphenylene ether (A). [0020]

Examples of the homopolymer in the polyphenylene ether (A) include, but are not limited to, poly(2,6-dimethyl-1,4-phenylene)ether, poly(2-methyl-6-ethyl-1,4-phenylene) ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene) ether, poly(2-ethyl-6-isopropyl-1,4-phenylene)ether, poly (2-methyl-6--hydroxyethyl-1,4-phenylene)ether, and poly (2-methyl-6-chloroethyl-1,4-phenylene)ether.

Above all, poly(2,6-dimethyl-1,4-phenylene)ether is preferable from the viewpoints of the easiness of procurement of the raw material, and the processability.

Examples of the copolymer in polyphenylene ether (A) include, but are not limited to, copolymers having a polyphenylene ether structure as a main structure such as a copolymer of 2,6-dimethylphenol and 2,3,6-trimethylphenol, a copolymer of 2,6-dimethylphenol and o-cresol, and a copolymer of 2,3,6-trimethylphenol and o-cresol.

Above all, the copolymer of 2,6-dimethylphenol and 2,3,6-trimethylphenol is preferable from the viewpoints of the easiness of procurement of the raw material, and the processability; and the copolymer containing 90 to 70% by mass of 2,6-dimethylphenol and 10 to 30% by mass of 2,3,6-trimethylphenol is more preferable from the viewpoint of improvement in physical properties.

The above-mentioned various polyphenylene ethers (A) may be used singly or combinations of two or more.

Polyphenylene ether (A) may contain a phenylene ether unit other than general formulae (1) and (2) as a partial structure within limits not deteriorating the heat resistance of polyphenylene ether (A).

Examples of such a phenylene ether unit other than general formulae (1) and (2) include, but are not limited to, a 2-(dialkylaminomethyl)-6-methylphenylene ether unit and a 2-(N-alkyl-N-phenylaminomethyl)-6-methylphenylene ether unit described in Japanese Patent Laid-Open No. H01(1989)-297428 and Japanese Patent Laid-Open No. S63(1988)-301222.

In polyphenylene ether (A), diphenoquinone and the like may be bonded in a small amount in the main chain of a polyphenylene ether.

Furthermore, polyphenylene ether (A) may have a constitution in which part of or the whole of the polyphenylene ether is substituted by a functionalized polyphenylene ether by reacting (modifying) part of or the whole of the polyphenylene ether with a functionalizing agent containing an acyl functional group, and one or more selected from the functional group consisting of carboxylic acids, acid anhydrides, acid amides, imides, amines, orthoesters, and hydroxy and carboxylic acid ammonium salts.

The ratio (Mw/Mn value) of a weight-average molecular weight Mw and a number-average molecular weight Mn of polyphenylene ether (A) is preferably 2.0 to 5.5, more preferably 2.5 to 4.5, and still more preferably 3.0 to 4.5.

The Mw/Mn value of polyphenylene ether (A) is preferably 2.0 or more from the viewpoint of the molding processability of the resin composition of the present embodiment, and is preferably 5.5 or less from the viewpoint of the mechanical physical properties of the resin composition.

Herein, the weight-average molecular weight Mw and the number-average molecular weight Mn are obtained from molecular weights in terms of polystyrene according to gel permeation chromatography (GPC) measurement.

The content of polyphenylene ether (A) in the resin composition of the present embodiment is in a range of 60 to 95% by mass in 100% by mass of the resin composition. The content is preferably in a range of 70 to 90% by mass, and more preferably in a range of 70 to 85% by mass.

In consideration of using the resin composition of the present embodiment for a molded article for a light-reflecting part, the content of polyphenylene ether (A) is set to 60% by mass or more from the viewpoint of heat resistance, and is set to 95% by mass or less from the viewpoint of obtaining good molding fluidity.

(Styrene-Based Resin (B))

In the resin composition of the present embodiment, styrene-based resin (B) (herein, may be described as component (B)) can be used as a component combined with the polyphenylene ether (A).

The styrene-based resin (B) is not particularly limited, and known styrene-based resins can be used.

Examples thereof include a homopolymer of a styrene-based compound, and a copolymer obtained by polymerizing a styrene-based compound and a compound copolymerizable with the styrene-based compound, in the presence or absence of a rubbery polymer.

Examples of the styrene-based compound include, but are not limited to, styrene, α-methylstyrene, 2,4-dimethylstyrene, monochlorostyrene, p-methylstyrene, p-tert-butylstyrene and ethylstyrene. In particular, styrene is preferable from the viewpoint of the practicality of the raw material.

Examples of the compound copolymerizable with a styrene-based compound include, but are not limited to, methacrylate esters such as methyl methacrylate and ethyl methacrylate; unsaturated nitrile compounds such as acrylonitrile and methacrylonitrile; and acid anhydrides such as maleic anhydride.

As styrene-based resin (B), a non-rubber-reinforced styrene-based resin is preferable from the viewpoint of obtaining the appearance of a molded article, and particularly good brightness feeling.

The content of styrene-based resin (B) is in a range of 35 to 0% by mass in 100% by mass of the resin composition of the present embodiment. The content is preferably in a range of 30 to 5% by mass, and more preferably in a range of 20 to 10% by mass.

An effect of improvement in molding fluidity in the resin composition of the present embodiment is obtained by adding styrene-based resin (B). The content of styrene-based resin (B) is set to 35% by mass or less in 100% by mass of the resin composition of the present embodiment from the viewpoint of securing heat resistance required for molded articles in the applications to light-reflecting parts such as an automotive lamp extension molded article.

(Elastomer Component (C))

The resin composition of the present embodiment contains elastomer component (C) (hereinafter, may be described as component (C)).

The resin composition of the present embodiment contains elastomer component (C), and thereby improvement in impact resistance is achieved.

A known elastomer component can be used as elastomer component (C), and elastomer component (C) is not particularly limited. Elastomer component (C) preferably contains a block copolymer having a styrene block and a hydrogenated conjugated diene compound block (hereinafter, may also be described as a "styrene block-hydrogenated conjugated diene compound block copolymer") from the viewpoints of the miscibility with component (A) and heat resistance.

The conjugated diene compound block is preferably hydrogenated in a hydrogen addition rate of 50% or more from the viewpoint of heat stability. The hydrogen addition rate is more preferably 80% or more, and still more preferably 95% or more.

Examples of the conjugated diene compound block include, but are not limited to, polybutadiene, polyisoprene, poly(ethylene-butylene), poly(ethylene-propylene) and vinyl-polyisoprene. The conjugated diene compound block may be used singly or in combinations of two or more.

The form of the arrangement of repeating units constituting a block copolymer may be of a linear type or a radial type.

The block structure composed of a polystyrene block and a rubber intermediate block may be any of two-block type, three-block type and four-block type. Above all, the block structure is preferably a block copolymer of a three-block linear type constituted of a polystyrene-poly(ethylene-butylene)-polystyrene structure from the viewpoint of ability to sufficiently exhibit desired effects in the present embodiment.

A butadiene unit may be contained in a range of not exceeding 30% by mass in a conjugated diene compound block from the viewpoint of the impartation of impact resistance.

The weight-average molecular weight Mw of the elastomer component (C) is preferably in a range of 50000 to 300000, more preferably 70000 to 280000, and still more preferably 100000 to 250000 from the viewpoint of improvement in impact resistance. The weight-average molecular weight Mw is preferably 50000 or more from the viewpoint of the impartation of sufficient impact resistance. The weight-average molecular weight Mw is preferably 300000 or less from the viewpoints of the fluidity of a molded body, the retention of appearance, and miscibility.

When the elastomer component (C) contains the styrene block-hydrogenated conjugated diene compound block copolymer, the bound styrene amount of the styrene block-hydrogenated conjugated diene compound block copolymer is preferably in a range of 20 to 80% by mass, more preferably 30 to 60% by mass, and still more preferably 30 to 45% by mass. The styrene amount is preferably 20% by mass or more from the viewpoint of miscibility. The styrene amount is preferably 90% or less from the viewpoint of the impartation of impact resistance.

Elastomer component (C) preferably contains an oil-extended elastomer component from the viewpoints of improvement in the appearance of the molded article of the present embodiment and improvement in molding fluidity, and more preferably contains an oil-extended styrene block-hydrogenated conjugated diene compound block copolymer.

Herein, the oil-extended elastomer component means an elastomer component into which a predetermined oil component to be described later is added.

When elastomer component (C) contains an oil-extended styrene block-hydrogenated conjugated diene copolymer, the oil-extended amount of the oil-extended styrene block-hydrogenated conjugated diene copolymer is preferably 20 to 50% by mass, more preferably 20 to 40% by mass, and still more preferably 25 to 35% by mass from the viewpoints of elastomer dispersibility in the resin composition and impact resistance.

Herein, examples of the oil component include a paraffinic process oil, a naphthenic process oil and an aromatic process oil; a mineral oil such as a liquid paraffin; and an oil generally used as a softening agent for rubber such as a castor oil. These oil components may be used singly or in combinations of two or more.

When the elastomer component, for example, the styrene block-hydrogenated conjugated diene compound block copolymer is manufactured, the copolymer may previously contain the oil component. When the styrene block-hydrogenated conjugated diene compound block copolymer is melt-kneaded in an extruder and the like, the oil component may be added into the copolymer.

The resin composition of the present embodiment contains, preferably 15 to 100 parts by mass, preferably 15 to 70 parts by mass, and preferably 20 to 55 parts by mass, of the oil component, based on 100 parts by mass of the elastomer component, for example, the styrene block-hydrogenated conjugated diene compound block copolymer from the viewpoints of the dispersibility of the elastomer component (C) and the prevention of oil bleeding.

When a high-molecular-weight type (Mw: 200000 to 300000) styrene block-hydrogenated conjugated diene compound block copolymer is singly used as elastomer component (C), the miscibility of the styrene block-hydrogenated conjugated diene compound block copolymer in the resin composition is not sufficient, which may cause delamination in the molded article.

For this reason, a middle-molecular-weight type (Mw: 60000 to 150000) styrene block-hydrogenated conjugated diene compound block copolymer having a bound styrene amount of 50 to 80% by mass, and an oil-extended styrene block-hydrogenated conjugated diene compound block copolymer are preferably used in combination.

The combination use ratio of the middle-molecular-weight type styrene block-hydrogenated conjugated diene compound block copolymer having a bound styrene amount of 50 to 80% by mass and/or the oil-extended styrene block-hydrogenated conjugated diene compound block copolymer and the high-molecular-weight type styrene block-hydrogenated conjugated diene compound block copolymer is in a range of a mass ratio of (the middle-molecular-weight type styrene block-hydrogenated conjugated diene compound block copolymer having a bound styrene amount of 50 to 80% by mass and/or the oil-extended styrene block-hydrogenated conjugated diene compound block copolymer: the high-molecular-weight type styrene block-hydrogenated conjugated diene compound block copolymer)=9:1 to 3:7, and more preferably in a range of 7:3 to 5:5.

The other elastomer component of the above-mentioned styrene block-hydrogenated conjugated diene compound block copolymer can also be used as elastomer (C). Examples of the other elastomer component include an olefin-based elastomer.

Examples of the olefin-based elastomer include, but are not limited to, an ethylene-based copolymer. Specific examples thereof include an ethylene-α-olefin copolymer such as an ethylene-octene copolymer, and an ethylene-alkyl (meth)acrylate copolymer such as an ethylene-methyl acrylate copolymer, an ethylene-ethyl acrylate copolymer, an ethylene-methyl methacrylate copolymer, or an ethylene-ethyl methacrylate copolymer.

When the ethylene-based copolymer is used as the olefin-based elastomer, a copolymerization ratio in the ethylene-based copolymer is preferably in a range of an ethylene component/a component copolymerizable with the ethylene component=(60 to 95)/(40 to 5) % by mass, more preferably in a range of (65 to 90)/(35 to 10) % by mass, and still more preferably (70 to 85)/(30 to 15) % by mass.

The copolymerization ratio is preferably in a range of the ethylene component/the component copolymerizable with the ethylene component=(60 to 95)/(40 to 5) % by mass from the viewpoint of improvement in miscibility with the styrene block-conjugated diene compound block copolymer, heat resistance, and mechanical physical properties and the like.

The resin composition of the present embodiment contains, as component (C), a styrene block-hydrogenated conjugated diene compound block copolymer and/or an oil-extended styrene block-hydrogenated conjugated diene compound block copolymer and an olefin-based elastomer in a mass ratio of (the styrene block-hydrogenated conjugated diene compound block copolymer and/or the oil-extended styrene block-hydrogenated conjugated diene compound block copolymer/the olefin-based elastomer)=9:1 to 3:7. The resin composition of the present embodiment contains, preferably 15 to 100 parts by mass, more preferably 15 to 70 parts by mass, and still more preferably 20 to 55 parts by mass of an oil, based on 100 parts by mass of the styrene block-hydrogenated conjugated diene compound block copolymer.

When the olefin-based elastomer as component (C) is singly added into the resin composition of the present embodiment, the miscibility of the olefin-based elastomer in the resin composition is not sufficient, which may cause delamination in the molded article. For this reason, the middle-molecular-weight type (Mw: 60000 to 150000) styrene block-hydrogenated conjugated diene compound block copolymer having a bound styrene amount of 50 to 80% by mass and the oil-extended styrene block-hydrogenated conjugated diene compound block copolymer are preferably used in combination.

The combination use ratio of the styrene block-hydrogenated conjugated diene compound block copolymer having a bound styrene amount of 50 to 80% by mass and/or the oil-extended styrene block-hydrogenated conjugated diene compound block and the olefin-based elastomer is preferably in a range of a mass ratio of (the styrene block-hydrogenated conjugated diene compound block copolymer having a bound styrene amount of 50 to 80% by mass and/or the oil-extended styrene block-hydrogenated conjugated diene compound block : the olefin-based elastomer)=9:1 to 3:7, and more preferably in a range of 7:3 to 5:5.

In the resin composition of the present embodiment, elastomer component (C) forms the dispersion phase containing the dispersion particles.

For the average particle size of the dispersion particles of elastomer component (C), a number average particle size is 0.04 to 0.25 μm, preferably 0.06 to 0.23 μm, and more preferably 0.08 to 0.22 μm. The number average particle size is set to 0.04 μm or more from the viewpoint of the retention of sufficient impact resistance of the resin composition, and the number average particle size is set to 0.25 μm or more from the viewpoint of the retention of the appearance of the molded article.

In the resin composition of the present embodiment, it is preferable that the dispersion particles having a particle size of greater than 1.0 μm are not present and the number of the dispersion particles having a particle size in a range of 0.5 to 1.0 μm is 3 or less in an area corresponding to 396 μm$^2$ as measured enlargedly by transmission electron microscopy.

The number average particle size and maximum particle size of the dispersion particles, and the number of the dispersion particles having a particle size in a range of 0.5 to 1.0 μm, in elastomer component (C) in the resin composition of the present embodiment can be measured by enlarging and observing a core layer (middle layer) part of the pellet or molded article of the resin composition of the present embodiment using an electron microscope.

The number average particle size of the dispersion particles of elastomer component (C) can be specifically measured as follows. A section of the core layer part of the pellet or the molded article of the resin composition in a cross-section surface of a surface in a flow direction of a resin is dyed by ruthenium. The section is then enlarged and shot at a magnification ratio of 50000 with a shooting viewing field changed with the transmission electron microscope. 100 (a total of 500) dispersion particles are selected at random from each of the shot five photographs. The number average particle size can be measured by using the dispersion particles.

The maximum particle size of the dispersion particles of elastomer component (C), and the number of the dispersion particles having a particle size in a range of 0.5 to 1.0 μm in the predetermined area can be calculated as described above. That is, a section of the core layer part of the pellet or molded article of the resin composition in a cross-section surface of a surface in a flow direction of a resin is dyed by ruthenium. The section is then enlarged and shot at a magnification ratio of 50000 with a shooting viewing field changed with the transmission electron microscope. By using the shot 25 photographs, the maximum particle size and the number of the dispersion particles can be calculated from an area corresponding to 396 μm$^2$ as measured.

When the above-mentioned dispersion form can be achieved, a specific material for elastomer component (C) can be appropriately selected. For example, the styrene block-hydrogenated conjugated diene compound block copolymer may be used singly, or the styrene block-hydrogenated conjugated diene compound block copolymer and other known elastomer components may be appropriately used in combinations of two or more.

In the resin composition of the present embodiment, elastomer component (C) which is suitable in order to achieve the dispersion form of desired elastomer component (C) is an elastomer component containing the oil-extended styrene block-hydrogenated conjugated diene compound block copolymer. Furthermore, elastomer component (C) is an elastomer component in which the oil-extended styrene block-hydrogenated conjugated diene compound block copolymer having an oil-extended amount of 20 to 50% by mass and the olefin-based elastomer are used in combination in a mass ratio of (the oil-extended styrene block-hydrogenated conjugated diene compound block copolymer having an oil-extended amount of 20 to 50% by mass: the olefin-based elastomer)=9:1 to 3:7.

The content of elastomer component (C) is in a range of 15 to 5% by mass in 100% by mass of the resin composition of the present embodiment. The content is preferably in a range of 12 to 5% by mass, and more preferably 12 to 7% by mass.

The content of elastomer component (C) is set to 5% by mass or more from the viewpoint of obtaining impact resistance required as a light-reflecting part such as an automotive lamp extension molded article. The content is set to 15% by mass or less from the viewpoints of heat resistance and the retention of rigidity.

(Other Materials)

To the extent that heat resistance, mechanical physical properties, and the surface appearance and brightness feeling of the molded article, and the like are not remarkably deteriorated, the resin composition of the present embodiment preferably contains each of various additive agents such as a heat stabilizer, an antioxidant, an ultraviolet absorber, an antistatic agent, a lubricant, and a mold release agent at a rate of 0.001 to 3 parts by mass based on 100 parts by mass of the total amount of components (A), (B), and (C). The amount of each of the various additive agents is more preferably 0.01 to 0.5 parts by mass, and still more preferably in a range of 0.2 to 0.5 parts by mass.

The amount of each of these additive agents is preferably set to 0.001 parts by mass or more from the viewpoint of the exhibition of a sufficient addition effect. The amount is preferably set to 3 parts by mass or less from the viewpoints of the sufficient appearance of the molded article and the retention of physical properties.

The resin composition of the present embodiment preferably contains no inorganic filler as a reinforcing agent as much as possible from the viewpoint of retaining the practically sufficient brightness feeling of the molded article obtained by molding the resin composition of the present embodiment.

The content of the inorganic filler is preferably 0 to 1 part by mass, and more preferably 0 to 0.5 part by mass based on 100 parts by mass of the total amount of components (A), (B), and (C).

The inorganic filler as a reinforcing agent is one commonly used for reinforcing a thermoplastic resin, and examples thereof include glass fiber, carbon fiber, glass flake, talc, and mica.

The resin composition of the present embodiment preferably has a specific gravity in a range of 1.00 to 1.12 from the viewpoints of an effect of reducing an environment load by light-weighting, and retaining practically sufficient heat resistance, mechanical strength, and appearance properties of the molded article, and the like. The resin composition has a specific gravity, more preferably in a range of 1.04 to 1.10, and still more preferably in a range of 1.05 to 1.08.

[Manufacturing Method Of Resin Composition]

The resin composition of the present embodiment can be manufactured by melt-kneading component (A), component (B), component (C), and the other materials if needed.

A condition in which component (C) is adjusted to the above-mentioned dispersion form in the resin composition may be selected as a melt-kneading condition for manufacturing the resin composition of the present embodiment.

When the pellet of the oil-extended styrene block-hydrogenated conjugated diene compound block copolymer is used as component (C), and melt-kneaded in the extruder to produce a resin composition in a large amount, the pellet may have high rubber elasticity, being hardly mixed with the other raw material components, and being classified, thus it is preferably separated from the other raw materials, and separately singly fed.

In a manufacturing process of the resin composition of the present embodiment, a twin screw extruder having a screw diameter of 25 to 90 mm is preferably used from the viewpoint of manufacturing efficiency.

Examples of a suitable method include a method in which when a TEM58SS twin screw extruder (manufactured by Toshiba Machine Co., Ltd., number of barrels: 13, screw diameter: 58 mm, L/D=53); screw pattern having 2 kneading discs L, 14 kneading discs R and 2 kneading discs N) is used, the components are melt-kneaded under conditions of a cylinder temperature of 270 to 330° C., a screw rotation speed of 150 to 800 rpm, an extrusion rate of 100 to 600 kg/h, and a vent vacuum degree of 11.0 to 1.0 kPa.

Herein, "L" is a "screw barrel length" of the extruder, and "D" is a "screw barrel diameter".

When the high-molecular-weight type (Mw: 200000 to 300000) styrene block-hydrogenated conjugated diene compound block copolymer and the middle-molecular-weight type (Mw: 60000 to 150000) styrene block-hydrogenated conjugated diene compound block copolymer having a bound styrene amount of 50 to 80% by mass and/or the oil-extended styrene block-hydrogenated conjugated diene compound block copolymer are used in combination as component (C), or when the olefin-based elastomer and the middle-molecular-weight type styrene block-hydrogenated conjugated diene compound block copolymer having a bound styrene amount of 50 to 80% by mass are used in combination, the dispersibility of the high-molecular-weight type styrene block-hydrogenated conjugated diene compound block copolymer component and the olefin-based elastomer component in the resin composition may be not sufficiently obtained under extrusion conditions to be usually performed; and defects such as fogging and flow mark may occur on the appearance of the molded article. Therefore, the components are preferably melt-kneaded with an extrusion rate set to be lower than normal and the screw rotation speed of the extruder set to be higher than normal.

When the TEM58SS twin screw extruder is used, the extrusion rate is preferably set to 100 to 300 kg/h, and the screw rotation speed is preferably set to 500 to 800 rpm. More preferably, the extrusion rate is 150 to 250 kg/h, and the screw rotation speed is 550 to 700 rpm. It is preferable that the extrusion rate is set to 100 kg/h or more and the screw rotation speed is set to 800 rpm or less from the viewpoint of suppressing deterioration in physical properties due to the heat deterioration of a resin component. It is preferable that the extrusion rate is set to 300 kg/h or less and the screw rotation speed is set to 500 rpm or more from the viewpoint of improvement in the appearance properties of the molded article.

It is necessary to note that when the resin composition of the present embodiment is manufactured using a larger twin screw extruder (screw diameter: 40 to 90 mm), gel and carbide generated from polyphenylene ether (A) during extrusion may be incorporated into an extruded resin pellet to thereby cause the appearance properties and brightness feeling of the surface of the molded article to be deteriorated.

In view of the point, it is preferable that polyphenylene ether (A) is charged from a raw material-charging inlet at the most upstream (top feed) and an oxygen concentration in the inside of a shooter on the charging inlet at the most upstream is set to 15 volume % or less. The oxygen concentration is more preferably set to 8 volume % or less, and still more preferably 1 volume % or less.

The oxygen concentration can be controlled by adjusting a nitrogen feed amount and adjusting the opening degree of a gas drain port in addition to sufficiently replacing the inside of a raw material storage hopper with nitrogen and sealing the way of a feed line from the raw material storage hopper to the raw material-charging inlet of the twin screw extruder so as not to allow air to come in and out.

[Molded Article]

A molded article made of the resin composition of the present embodiment can be obtained by molding the above-mentioned resin composition.

Suitable examples of a method for molding the resin composition include, but are not particularly limited to, methods such as injection molding, extrusion, vacuum forming, and air-pressure forming. The injection molding is particularly preferable from the viewpoints of the appearance properties and brightness feeling of the molded article.

The molded article of the present embodiment is specified to have excellent mechanical physical properties such as heat resistance, impact resistance, and a peeling preventing effect, and to have predetermined dispersion properties in elastomer component (C), and thereby remarkably excellent appearance properties can be applied to the surface of the molded article. Therefore, the molded article can be suitably used for molded articles for light-reflecting parts such as a projector and various light devices, lamp reflector parts for automobiles, and various molded articles for automotive lamp extensions, and the like. Above all, the molded articles for automotive lamp extensions are preferable.

FIG. 1 shows a schematic construction view of an automotive headlamp including an automotive lamp extension as a molded article of the present embodiment.

As shown in FIG. 1, an automotive headlamp includes housing 1 located inside an exterior of an automobile, and front lens 2 located on the exterior surface side of the automobile. Light source 3 near which reflector 5 is disposed, and extension 4 are disposed in a region surrounded by housing 1 and front lens 2. An arrow shown by a dashed line in FIG. 1 represents a positional relationship when constitution members of the automotive headlamp are combined.

Light emitted from light source 3 and reflected by reflector 5 is further reflected by extension 4, and emitted to the outside of the automobile from front lens 2.

EXAMPLES

Hereinafter, the present invention is described with reference to specific Examples and Comparative Examples, but the present invention should not be limited thereto.

Measuring methods of physical properties and raw materials used in Examples and Comparative Examples are shown below.

[Measuring Methods of Physical Properties]
(1. Deflection Temperature Under Load (DTUL))

Each of the resin composition pellets manufactured in Examples and Comparative Examples was dried in a hot air dryer at 120° C. for 3 hours.

The resin composition after drying was molded by an injection molding machine (IS-80EPN, manufactured by Toshiba Machine Co., Ltd.) equipped with an ISO physical-properties test piece mold, set at a cylinder temperature of 320° C., a mold temperature of 120° C., an injection pressure of 50 MPa (gage pressure), an injection speed of 200 mm/sec, and an injection time/a cool time=20 sec/20sec, to obtain an ISO3167 dumbbell-shaped molded piece as a multipurpose test piece (A type). The obtained dumbbell-shaped molded piece as the multipurpose test piece (A type) was cut to produce a test piece of 80 mm×10 mm×4 mm. A deflection temperature under load (DTUL) was measured at 1.82 MPa according to a flat-wise method with reference to ISO75 using the test piece.

For evaluation criteria, it was determined that as DTUL is a higher value, heat resistance is more excellent.

(2. Fluidity (MFR))

Each of the resin composition pellets manufactured in Examples and Comparative Examples was dried in a hot air dryer at 120° C. for 3 hours. After drying, a MFR (Melt Flow Rate) was measured using a melt indexer (P-111, manufactured by Toyo Seiki Seisaku-Sho, Ltd.) at a cylinder setting temperature of 280° C. and at a load of 10 kg.

For evaluation criteria, it was determined that as the MFR is higher, fluidity is more excellent. [0058]
(3. Charpy Impact Strength (Impact Resistance))

Each of the five test pieces of 80 mm×10 mm x 4 mm obtained in the item 1 was notched, and a Charpy impact strength was measured with reference to ISO179.

For evaluation criteria, it was determined that as the measured value is higher, impact resistance is more excellent.

(4. Molding Appearance (Fogging Feeling))

A dead side grip portion of the ISO3167 dumbbell-shaped molded piece as the multipurpose test piece (A type) manufactured in the item 1 was visually observed to evaluate the presence or absence of the fogging feeling of the surface of the molded piece in two stages of "good" (no fogging feeling) and "poor" (fogging feeling).

When the surface of the molded piece having fogging feeling was enlarged and observed with a microscope (×60), a number of fine surface unevennesses considered to be based on the dispersion particles of the elastomer component (C) were observed. However, an extremely small number of unevennesses were confirmed on the molded piece having good appearance having no fogging feeling, or the unevennesses were not confirmed at all.

(5. Molding Appearance (Presence or Absence of Flow Mark))

A gate side grip portion of the ISO3167 dumbbell-shaped molded piece as the multipurpose test piece (A type) manufactured in the item 1 was mainly visually observed to determine the presence or absence of the occurrence of flow mark.

It was determined that the resin composition of the molded piece in which the occurrence of the flow mark is confirmed has a poor appearance property.

(6. Bending Of Molded Piece (Brittleness, Peeling))

The ISO3167 dumbbell-shaped molded piece as the multipurpose test piece (A type) manufactured in above 1. was subjected to a bending test, and the presence or absence of brittleness and delamination in fracture was visually evaluated.

A case where the molded piece was not folded up during the bending test and brittle fracture occurred was determined to be a brittle state.

A case where brittleness and delamination did not occur was defined as "good", and a case where brittleness and delamination occurred was defined as "poor".

(7. Number Average Particle Size of Dispersion Particles of Elastomer Component (C) in Resin Composition)

The core layer part of the central part of the ISO3167 dumbbell-shaped molded piece as the multipurpose test piece (A type) manufactured in above 1., i.e., a section of a cross-section surface in a flow direction was dyed by ruthenium. The section was then enlarged and shot at a magnification ratio of 50000 with the transmission electron microscope.

There was calculated the number average particle size of the 100 (a total of 500) dispersion particles of elastomer component (C) extracted at random from each of five photographs shot with a shooting viewing field changed.

As reference, FIG. 2 shows an electron microscope photograph (magnification ratio: 10000) of an example of a resin composition in which the particles of elastomer component (C) (a black portion in FIG. 2) are in a dispersion state satisfying following conditions (i) to (iii)
(i) a number average particle size is 0.04 to 0.25 µm;
(ii) no particles having a particle size of greater than 1.0 µm in an area of 396 µm² are present; and
(iii) the number of particles having a particle size of 0.5 to 1.0 µm in an area of 396 µm² is 3 or less.

FIG. 3 shows an electron microscope photograph (magnification ratio: 10000) of an example of a resin composition in which the particles of elastomer component (C) (a black portion in FIG. 3) are in a dispersion state not satisfying at least one of following conditions (i) to (iii):
(i) a number average particle size is 0.04 to 0.25 µm.
(ii) no particles having a particle size of greater than 1.0 µm in an area of 396 µm² are present; and
(iii) the number of particles having a particle size of 0.5 to 1.0 µm in an area of 396 µm² is 3 or less.

(8. Maximum Particle Size of Dispersion Particles of Elastomer Component (C) in Resin Composition, and the Number of Dispersion Particles Having Particle Size in a range of 0.5 to 1.0 µm)

The core layer part of the central part of the ISO3167 dumbbell-shaped molded piece as the multipurpose test piece (A type) manufactured in above 1., i.e., a section of a cross-section surface in a flow direction was dyed by ruthenium. The section was then enlarged and shot at a magnification ratio of 50000 with the transmission electron microscope.

A portion corresponding to an area of 396 µm² as measured was extracted from 25 photographs shot with a shooting viewing field changed. The maximum particle size of the dispersion particles of elastomer component (C) and the number of the dispersion particles having a particle size in a range of 0.5 to 1.0 µm were calculated from the photographs.

[Raw Materials]
<Polyphenylene Ether (A)>
(PPE1): Poly(2,6-dimethyl-1,4-phenylene)ether having a reduced viscosity (measured at 30° C. using a chloroform solvent) of 0.32 dl/g was used.
(PPE2): Poly(2,6-dimethyl-1,4-phenylene)ether having a reduced viscosity (measured at 30° C. using a chloroform solvent) of 0.42 dl/g was used.
<Styrene-Based Resin (B)>
(GPPS): Polystyrene 685 (trade name) (registered trademark) manufactured by Asahi Kasei Chemicals, Corp. was used.
<Elastomer Component (C)>
(Elastomer 1): A three-block type hydrogenated block copolymer having a weight-average molecular weight of 100900 and a bound styrene amount of 60% by mass, and containing a polystyrene block and a hydrogenated butadiene block having a hydrogen addition rate of 98%.
(Elastomer 2): A three-block type hydrogenated block copolymer having a weight-average molecular weight of 264000 and a bound styrene amount of 33% by mass, and containing a polystyrene block and a hydrogenated butadiene block having a hydrogen addition rate of 98%
(Elastomer 3): A hydrogenated block copolymer oil-extended in a ratio of the elastomer 2/ a liquid paraffin-based oil=65/35% by mass.
(Elastomer 4): ELVALOY AC1125 (trade name) (registered trademark), an olefin-based elastomer (ethylene-methyl acrylate copolymer) manufactured by DuPont-Mitsui Polychemicals Co., Ltd. and having a methyl acrylate content of 25% by mass.
(Elastomer 5): A hydrogenated block copolymer oil-extended in a ratio of the elastomer 2/a liquid paraffin-based oil=54/46% by mass.
(Elastomer 6): A hydrogenated block copolymer having a weight-average molecular weight of 105200 and a bound styrene amount of 29% by mass, containing a polystyrene block and a hydrogenated butadiene block having a hydrogen addition rate of 98%, and oil-extended in a ratio of a three-block type hydrogenated block copolymer/a liquid paraffin-based oil=80/20% by mass.

Example 1

72% by mass of (PPE2), 20% by mass of (GPPS), 4% by mass of an (elastomer 1), and 4% by mass of an (elastomer 3) were supplied from the most upstream (top feed) of a TEM58SS twin screw extruder (manufactured by Toshiba Machine Co., Ltd., having a number of barrels of 13, a screw diameter of 58 mm, L (screw barrel length)/D (screw barrel diameter)=53, and screw pattern having 2 kneading discs L, 14 kneading discs R and 2 kneading discs N), and melt-kneaded at a cylinder temperature of 300° C., a screw rotation speed of 400 rpm, an extrusion rate of 400 kg/hr, and a vent vacuum degree of 7.998 kPa (60 Torr) to obtain a resin composition.

The measurement results of physical properties of the obtained resin composition are shown in following Table 1.

Example 2

72% by mass of (PPE2), 20% by mass of (GPPS), 2% by mass of an (elastomer 1), and 6% by mass of an (elastomer 3) were used. A resin composition was obtained in the same manner as in Example 1 except for the condition. The measurement results of physical properties of the obtained resin composition are shown in following Table 1.

Example 3

72% by mass of (PPE2), 20% by mass of (GPPS), and 8% by mass of an (elastomer 3) were used. A resin composition was obtained in the same manner as in Example 1 except for the condition. The measurement results of physical properties of the obtained resin composition are shown in following Table 1.

Example 4

72% by mass of (PPE2), 20% by mass of (GPPS), and 8% by mass of an (elastomer 5) were used. A resin composition was obtained in the same manner as in Example 1 except for the condition. The measurement results of physical properties of the obtained resin composition are shown in following Table 1.

Example 5

72% by mass of (PPE2), 20% by mass of (GPPS), and 8% by mass of an (elastomer 6) were used. A resin composition was obtained in the same manner as in Example 1 except for the condition. The measurement results of physical properties of the obtained resin composition are shown in following Table 1.

Comparative Example 1

72% by mass of (PPE2), and 28% by mass of (GPPS) were used. A resin composition was obtained in the same manner as in Example 1 except for the condition. The measurement results of physical properties of the obtained resin composition are shown in following Table 1.

Example 6

72% by mass of (PPE2), 20% by mass of (GPPS), 5% by mass of an (elastomer 1), and 3% by mass of an (elastomer 2) were used. A resin composition was obtained in the same manner as in Example 1 except for the condition. The measurement results of physical properties of the obtained resin composition are shown in following Table 1.

Example 7

72% by mass of (PPE2), 20% by mass of (GPPS), 7% by mass of an (elastomer 1), and 1% by mass of an (elastomer 2) were used. A resin composition was obtained in the same manner as in Example 1 except for the condition. The measurement results of physical properties of the obtained resin composition are shown in following Table 1.

Comparative Example 2

72% by mass of (PPE2), 20% by mass of (GPPS), and 8% by mass of an (elastomer 1) were used. A resin composition was obtained in the same manner as in Example 1 except for the condition. The measurement results of physical properties of the obtained resin composition are shown in following Table 1.

TABLE 1

|  |  | Comparative Example 1 | Example 1 | Example 2 | Example 3 | Example 4 |
|---|---|---|---|---|---|---|
| (Adding) % by mass |  |  |  |  |  |  |
| PPE2 (component A) $\eta$ = 0.42 dl/g |  | 72 | 72 | 72 | 72 | 72 |
| GPPS (component B) |  | 28 | 20 | 20 | 20 | 20 |
| Elastomer 1 (component C) |  |  | 4 | 2 |  |  |
| Elastomer 2 (component C) |  |  |  |  |  |  |
| Elastomer 3 (component C) |  |  | 4 | 6 | 8 |  |
| Elastomer 5 (component C) |  |  |  |  |  | 8 |
| Elastomer 6 (component) |  |  |  |  |  |  |
| Total |  | 100 | 100 | 100 | 100 | 100 |
| Number average particle size of elastomer in resin composition | μm | — | 0.06 | 0.09 | 0.12 | 0.10 |
| Maximum particle size of elastomer in resin composition | μm | — | 0.08 | 0.14 | 0.23 | 0.12 |
| Number of elastomers (particle size: 0.5 to 1.0 μm) in resin composition | piece | — | 0 | 0 | 0 | 0 |
| (Physical properties) |  |  |  |  |  |  |
| DTUL (1.82 MPa) | ° C. | 142 | 146 | 147 | 148 | 144 |
| MFR (280° C./10 kg) | g/10 min | 22 | 23 | 25 | 25 | 33 |
| Charpy impact strength | kJ/m2 | 0.6 | 3.6 | 4.4 | 6.1 | 4.8 |
| Molding appearance (fogging) |  | good | good | good | good | good |
| Presence or absence of flow mark of molded piece |  | absence | absence | absence | absence | absence |
| Peeling (ISO dumbbell bending) |  | poor (brittleness) | good | good | good | good |

|  |  | Example 5 | Example 6 | Example 7 | Comparative Example 2 |
|---|---|---|---|---|---|
| (Adding) % by mass |  |  |  |  |  |
| PPE2 (component A) $\eta$ = 0.42 dl/g |  | 72 | 72 | 72 | 72 |
| GPPS (component B) |  | 20 | 20 | 20 | 20 |
| Elastomer 1 (component C) |  |  | 5 | 7 | 8 |
| Elastomer 2 (component C) |  |  | 3 | 1 |  |
| Elastomer 3 (component C) |  |  |  |  |  |
| Elastomer 5 (component C) |  |  |  |  |  |
| Elastomer 6 (component) |  | 8 |  |  |  |
| Total |  | 100 | 100 | 100 | 100 |
| Number average particle size of elastomer in resin composition | μm | 0.13 | 0.12 | 0.05 | 0.02 |
| Maximum particle size of elastomer in resin composition | μm | 0.25 | 1.8 | 1.1 | 0.05 |
| Number of elastomers (particle size: 0.5 to 1.0 μm) in resin composition | piece | 0 | 8 | 5 | 0 |

TABLE 1-continued

| (Physical properties) | | | | | |
|---|---|---|---|---|---|
| DTUL (1.82 MPa) | ° C. | 148 | 149 | 148 | 143 |
| MFR (280° C./10 kg) | g/10 min | 28 | 12 | 18 | 22 |
| Charpy impact strength | kJ/m2 | 7.1 | 7.5 | 2.8 | 1.6 |
| Molding appearance (fogging) | | good | poor | poor | good |
| Presence or absence of flow mark of molded piece | | absence | presence | presence | absence |
| Peeling (ISO dumbbell bending) | | good | good | good | poor (brittleness) |

As shown in Table 1, the dispersion form of component (C) was in the range regulated in present invention in Examples 1 to 7. Therefore, Examples 1 to 7 provided resin compositions having high impact resistance and a high peeling preventing effect.

In particular, Examples 1 to 5 provided the resin compositions having well-balanced physical properties such as heat resistance, molding fluidity and impact resistance, and exhibiting good molding appearance having no flow mark and no fogging feeling occurring on the surface of the molded article. The resin compositions could be suitably used as the molded article for the applications to light-reflecting parts.

Meanwhile, the resin compositions of Comparative Examples 1 and 2 did not contain component (C), or the number average particle size of the dispersion particles was small and beyond the scope recited in the present invention even when the resin compositions contained component (C). Therefore, the resin compositions were brittle materials and did not have sufficient impact resistance.

Example 8

72% by mass of (PPE2), 20% by mass of (GPPS), 4% by mass of an (elastomer 1), and 4% by mass of an (elastomer 4) were used. A resin composition was obtained in the same manner as in Example 1 except for the condition. The measurement results of physical properties of the obtained resin composition are shown in the following Table 2.

Example 9

72% by mass of (PPE2), 20% by mass of (GPPS), 6% by mass of an (elastomer 3), and 2% by mass of an (elastomer 4) were used. A resin composition was obtained in the same manner as in Example 1 except for the condition. The measurement results of physical properties of the obtained resin composition are shown in following Table 2.

Example 10

72% by mass of (PPE2), 20% by mass of (GPPS), 4% by mass of an (elastomer 3), and 4% by mass of an (elastomer 4) were used. A resin composition was obtained in the same manner as in Example 1 except for the condition. The measurement results of physical properties of the obtained resin composition are shown in following Table 2.

Example 11

60% by mass of (PPE2), 25% by mass of (GPPS), 5% by mass of an (elastomer 1), and 10% by mass of an (elastomer 3) were used. A resin composition was obtained in the same manner as in Example 1 except for the condition. The measurement results of physical properties of the obtained resin composition are shown in following Table 2.

Example 12

90% by mass of (PPE2), 5% by mass of (GPPS), 3% by mass of an (elastomer 3), and 2% by mass of an (elastomer 4) were used. A resin composition was obtained in the same manner as in Example 1 except for the condition. The measurement results of physical properties of the obtained resin composition are shown in following Table 2.

Example 13

90% by mass of (PPE2), 7% by mass of an (elastomer 3), and 3% by mass of an (elastomer 4) were used. A resin composition was obtained in the same manner as in Example 1 except for the condition. The measurement results of physical properties of the obtained resin composition are shown in following Table 2.

Comparative Example 3

72% by mass of (PPE2), 20% by mass of (GPPS), 6% by mass of an (elastomer 1), and 2% by mass of an (elastomer 4) were used. A resin composition was obtained in the same manner as in Example 1 except for the condition. The measurement results of physical properties of the obtained resin composition are shown in following Table 2.

Comparative Example 4

72% by mass of (PPE2), 20% by mass of (GPPS), 2% by mass of an (elastomer 3), and 6% by mass of an (elastomer 4) were used. A resin composition was obtained in the same manner as in Example 1 except for the condition. The measurement results of physical properties of the obtained resin composition are shown in following Table 2.

Comparative Example 5

72% by mass of (PPE2), 23% by mass of (GPPS), and 5% by mass of an (elastomer 2) were used. A resin composition was obtained in the same manner as in Example 1 except for the condition. The measurement results of physical properties of the obtained resin composition are shown in following Table 2.

TABLE 2

| | | Comparative Example 3 | Example 8 | Example 9 | Example 10 | Comparative Example 4 |
|---|---|---|---|---|---|---|
| (Adding) % by mass | | | | | | |
| PPE2 (component A) η = 0.42 dl/g | | 72 | 72 | 72 | 72 | 72 |
| GPPS (component B) | | 20 | 20 | 20 | 20 | 20 |
| Elastomer 1 (component C) | | 6 | 4 | | | |
| Elastomer 2 (component C) | | | | | | |
| Elastomer 3 (component C) | | | | 6 | 4 | 2 |
| Elastomer 4 (component C) | | 2 | 4 | 2 | 4 | 6 |
| Total | | 100 | 100 | 100 | 100 | 100 |
| Number average particle size of elastomer in resin composition | μm | 0.03 | 0.16 | 0.12 | 0.16 | 0.27 |
| Maximum particle size of elastomer in resin composition | μm | 0.24 | 1.5 | 0.26 | 0.57 | 0.77 |
| Number of elastomers (particle size: 0.5 to 1.0 μm) in resin composition | piece | 0 | 4 | 0 | 1 | 5 |
| (Physical properties) | | | | | | |
| DTUL (1.82 MPa) | °C. | 149 | 153 | 154 | 158 | 160 |
| MFR (280° C./10 kg) | g/10 min | 19 | 15 | 20 | 17 | 13 |
| Charpy impact strength | kJ/m2 | 1.9 | 2.8 | 8.3 | 8.8 | 3.8 |
| Molding appearance (fogging) | | good | good | good | good | poor |
| Presence or absence of flow mark of molded piece | | absence | presence | absence | absence | presence |
| Peeling (ISO dumbbell bending) | | poor (brittleness) | good | good | good | poor (peeling) |

| | | Comparative Example 5 | Example 11 | Example 12 | Example 13 |
|---|---|---|---|---|---|
| (Adding) % by mass | | | | | |
| PPE2 (component A) η = 0.42 dl/g | | 72 | 60 | 90 | 90 |
| GPPS (component B) | | 23 | 25 | 5 | |
| Elastomer 1 (component C) | | | 5 | | |
| Elastomer 2 (component C) | | 5 | | | |
| Elastomer 3 (component C) | | | 10 | 3 | 7 |
| Elastomer 4 (component C) | | | | 2 | 3 |
| Total | | 100 | 100 | 100 | 100 |
| Number average particle size of elastomer in resin composition | μm | 0.38 | 0.14 | 0.22 | 0.11 |
| Maximum particle size of elastomer in resin composition | μm | 2.2 | 0.25 | 0.82 | 0.31 |
| Number of elastomers (particle size: 0.5 to 1.0 μm) in resin composition | piece | 9 | 0 | 2 | 0 |
| (Physical properties) | | | | | |
| DTUL (1.82 MPa) | °C. | 155 | 132 | 177 | 183 |
| MFR (280° C./10 kg) | g/10 min | 10 | 213 | 8.1 | 3.8 |
| Charpy impact strength | kJ/m2 | 14.7 | 13.2 | 7.6 | 13.6 |
| Molding appearance (fogging) | | poor | good | good | good |
| Presence or absence of flow mark of molded piece | | presence | absence | absence | absence |
| Peeling (ISO dumbbell bending) | | poor (peeling) | good | good | good |

As shown in Table 2, the dispersion form of component (C) was within the scope recited in present invention in Examples 8 to 13. Therefore, Examples 8 to 13 provided resin compositions having high impact resistance and a high peeling preventing effect.

In particular, Examples 9 to 13 provided the resin compositions having well-balanced physical properties such as heat resistance, molding fluidity and impact resistance, and exhibiting good molding appearance having no flow mark and no fogging feeling occurring on the surface of the molded article. The resin compositions could be suitably used as the molded article for applications to light-reflecting parts and the like.

Meanwhile, in the resin composition of Comparative Example 3, the dispersion particle size of component (C) was small, and the number average particle size was beyond the scope recited in the present invention. Therefore, the resin composition was a brittle material and did not have sufficient impact resistance.

In each of the resin compositions of Comparative Examples 4 and 5, many of components (C) had a larger dispersion particle size in the resin composition, and the number average particle size was also beyond the scope recited in the present invention. Therefore, the peeling properties of the molded article were not sufficient; the molded article had defects such as fogging feeling and flow mark; and practically sufficient appearance properties were not obtained.

Example 14

82% by mass of (PPE1), 10% by mass of (GPPS), 6% by mass of an (elastomer 1), and 2% by mass of an (elastomer 2) were used. A resin composition was obtained in the same manner as in Example 1 except for the condition. The measurement results of physical properties of the obtained resin composition are shown in following Table 3.

Example 15

82% by mass of (PPE1), 10% by mass of (GPPS), 6% by mass of an (elastomer 1), and 2% by mass of an (elastomer 2) were used. A screw rotation speed was changed to 550 rpm from 400 rpm, and an extrusion rate was changed to 250 kg/hr from 400 kg/hr. A resin composition was obtained in the same manner as in Example 1 except for the conditions. The measurement results of physical properties of the obtained resin composition are shown in following Table 3.

Example 16

72% by mass of (PPE2), 20% by mass of (GPPS), 6% by mass of an (elastomer 1), and 2% by mass of an (elastomer 2) were used.

A screw rotation speed was changed to 550 rpm from 400 rpm, and an extrusion rate was changed to 250 kg/hr from 400 kg/hr. A resin composition was obtained in the same manner as in Example 1 except for the conditions. The measurement results of physical properties of the obtained resin composition are shown in following Table 3.

Example 17

82% by mass of (PPE1), 10% by mass of (GPPS), 4% by mass of an (elastomer 1), and 4% by mass of an (elastomer 4) were used. A resin composition was obtained in the same manner as in Example 1 except for the condition. The measurement results of physical properties of the obtained resin composition are shown in following Table 3.

Example 18

82% by mass of (PPE1), 10% by mass of (GPPS), 4% by mass of an (elastomer 1), and 4% by mass of an (elastomer 4) were used.

A screw rotation speed was changed to 550 rpm from 400 rpm, and an extrusion rate was changed to 200 kg/hr from 400 kg/hr. A resin composition was obtained in the same manner as in Example 1 except for the conditions. The measurement results of physical properties of the obtained resin composition are shown in following Table 3.

Example 19

72% by mass of (PPE2), 20% by mass of (GPPS), 2% by mass of an (elastomer 3), and 6% by mass of an (elastomer 4) were used.

A screw rotation speed was changed to 550 rpm from 400 rpm, and an extrusion rate was changed to 200 kg/hr from 400 kg/hr. A resin composition was obtained in the same manner as in Example 1 except for the conditions. The measurement results of physical properties of the obtained resin composition are shown in following Table 3.

TABLE 3

|  |  | Example 14 | Example 15 | Example 16 | Example 17 | Example 18 | Example 19 |
|---|---|---|---|---|---|---|---|
| (Adding) % by mass |  |  |  |  |  |  |  |
| PPE1 (component A) η = 0.32 dl/g |  | 82 | 82 |  | 82 | 82 |  |
| PPE2 (component A) η = 0.42 dl/g |  |  |  | 72 |  |  | 72 |
| GPPS (component B) |  | 10 | 10 | 20 | 10 | 10 | 20 |
| Elastomer 1 (component C) |  | 6 | 6 | 6 | 4 | 4 |  |
| Elastomer 2 (component C) |  | 2 | 2 | 2 |  |  |  |
| Elastomer 3 (component C) |  |  |  |  |  |  | 2 |
| Elastomer 4 (component C) |  |  |  |  | 4 | 4 | 6 |
| Total |  | 100 | 100 | 100 | 100 | 100 | 100 |
| (Extrusion condition) |  |  |  |  |  |  |  |
| Extrusion rate | kg/hr | 400 | 250 | 250 | 400 | 250 | 200 |
| Screw rotation speed | rpm | 400 | 550 | 500 | 400 | 550 | 550 |
| Number average particle size of elastomer in resin composition | μm | 0.05 | 0.04 | 0.04 | 0.13 | 0.13 | 0.20 |
| Maximum particle size of elastomer in resin composition | μm | 0.80 | 0.52 | 0.53 | 0.72 | 0.26 | 0.23 |
| Number of elastomers (particle size of 0.5 to 1.0 μm) in resin composition | piece | 7 | 2 | 2 | 11 | 0 | 0 |
| (Physical properties) |  |  |  |  |  |  |  |
| DTUL (1.82 MPa) | °C. | 160 | 160 | 147 | 163 | 161 | 156 |
| MFR (280° C./10 kg) | g/10 min | 22 | 24 | 17 | 24 | 26 | 17 |
| Charpy impact strength | kJ/m2 | 5.8 | 5.5 | 3.6 | 2.8 | 2.7 | 4.1 |
| Molding appearance (fogging) |  | poor | good | good | poor | good | good |
| Presence or absence of flow mark of molded piece |  | presence | absence | absence | presence | absence | absence |
| Peeling (ISO dumbbell bending) |  | good | good | good | good | good | good |

As shown in Table 3, in Examples 14 to 19, the dispersion form of component (C) was within the scope recited in the present invention. Therefore, Examples 14 to 19 provided resin compositions having high impact resistance and a high peeling preventing effect.

In particular, each of the resin compositions of Examples 15, 18, and 19 in Table 3 had the same composition as that of each of Example 14 and Example 17 in Table 3 and Comparative Example 4 in Table 2. However, there was obtained resin compositions having well-balanced physical properties such as heat resistance, molding fluidity and impact resistance, and exhibiting good appearance properties without having flow mark and fogging feeling occurring on the surface of the molded article since the extrusion condition was adjusted to improve the dispersibility of component (C), thereby improving the dispersion form. Therefore, the resin compositions could be suitably used as the molded article for applications to light-reflecting parts and the like.

The resin composition of Example 16 had a composition close to that of the resin composition of Example 7 in Table 1, and the amount of the (elastomer 2) component was increased as the resin composition. Therefore, in the same extrusion condition as that of Example 7, more dispersion particles of component (C) were predicted to tend to have a larger diameter. However, there were obtained resin compositions having well-balanced physical properties such as heat resistance, molding fluidity and impact resistance, and exhibiting good appearance properties without having flow mark and fogging feeling occurring on the surface of the molded article since the extrusion condition was adjusted to improve the dispersibility of component (C). Therefore, the resin compositions could be suitably used as the molded article for applications to light-reflecting parts and the like.

The present application is based on Japanese Patent Application (Japanese Patent Application No. 2013-086736) filed to the Japan patent office on Apr. 17, 2013, the contents of which are herein incorporated by reference.

INDUSTRIAL APPLICABILITY

The resin composition of the present invention has industrial applicability as a molded article for an automotive lamp extension, and a molded article for a light-reflecting part.

The invention claimed is:

1. A molded article for a light-reflecting part comprising a resin composition comprising:
    60 to 93% by mass of polyphenylene ether (A);
    35 to 0% by mass of styrene-based resin (B); and
    15 to 7% by mass of elastomer component (C),
    wherein the composition comprising no rubber;
    wherein
    a reduced viscosity of the polyphenylene ether (A), measured in a 0.5 g/dl solution under a temperature condition of 30° C. using a chloroform solvent, is 0.25 to 0.45 dl/g;
    the styrene-based resin (B) is a non-rubber-reinforced styrene-based resin;
    the elastomer component (C) comprises a block copolymer having a styrene block and a hydrogenated conjugated diene compound block, and has a hydrogen addition rate of 50% or more;
    the elastomer component (C) is present as dispersion particles in the resin composition; and
    the dispersion particles have a number average particle size of 0.04 to 0.25 µm; and the dispersion particles having a particle size of greater than 1.0 µm are not present and the number of the dispersion particles having a particle size of 0.5 to 1.0 µm is 3 or less in an area corresponding to 396 µm² as measured by transmission electron microscopy.

2. The molded article for the light-reflecting part according to claim 1, wherein the elastomer component (C) comprises an oil-extended styrene block-hydrogenated conjugated diene compound block copolymer.

3. The molded article for the light-reflecting part according to claim 2, wherein the elastomer component (C) comprises an oil-extended styrene block-hydrogenated conjugated diene compound block copolymer having an oil-extended amount of 20 to 50% by mass.

4. The molded article for the light-reflecting part according to claim 2, wherein the elastomer component (C) comprises the oil-extended styrene block-hydrogenated conjugated diene compound block copolymer having an oil-extended amount of 20 to 50% by mass and an olefin-based elastomer in a mass ratio of (the oil-extended styrene block -hydrogenated conjugated diene compound block copolymer having an oil-extended amount of 20 to 50% by mass : the olefin-based elastomer) =9:1 to 3:7.

5. The molded article for the light-reflecting part according to claim 2, wherein the resin composition comprises 15 to 100 parts by mass of an oil based on 100 parts by mass of the styrene block-hydrogenated conjugated diene compound block copolymer.

6. The resin composition according to claim 1, wherein the component (C) comprises a styrene block-hydrogenated conjugated diene compound block copolymer and/or an oil-extended styrene block-hydrogenated conjugated diene compound block copolymer and an olefin-based elastomer in a mass ratio of (the styrene block-hydrogenated conjugated diene compound block copolymer and/or the oil-extended styrene block-hydrogenated conjugated diene compound block copolymer/the olefin-based elastomer) =9:1 to 3:7, and
    the resin composition comprises 15 to 100 parts by mass of an oil based on 100 parts by mass of the styrene block-hydrogenated conjugated diene compound block copolymer.

7. A molded article for an automotive lamp extension comprising a resin composition comprising:
    60 to 93% by mass of polyphenylene ether (A);
    35 to 0% by mass of styrene-based resin (B); and
    15 to 7% by mass of elastomer component (C),
    wherein the composition comprising no rubber;
    wherein
    a reduced viscosity of the polyphenylene ether (A), measured in a 0.5 g/dl solution under a temperature condition of 30° C. using a chloroform solvent, is 0.25 to 0.45 dl/g;
    the styrene-based resin (B) is a non-rubber-reinforced styrene-based resin;
    the elastomer component (C) comprises a block copolymer having a styrene block and a hydrogenated conjugated diene compound block;
    the elastomer component (C) is present as dispersion particles in the resin composition; and
    the dispersion particles have a number average particle size of 0.04 to 0.25 µm; and the dispersion particles having a particle size of greater than 1.0 µm are not present and the number of the dispersion particles having a particle size of 0.5 to 1.0 µm is 3 or less in an area corresponding to 396 µm² as measured by transmission electron microscopy.

8. The molded article for the light-reflecting part according to claim 2, wherein the component (C) comprises a styrene block-hydrogenated conjugated diene compound block copolymer and/or an oil-extended styrene block-hydrogenated conjugated diene compound block copolymer and an olefin-based elastomer in a mass ratio of (the styrene block-hydrogenated conjugated diene compound block copolymer and/or the oil-extended styrene block-hydrogenated conjugated diene compound block copolymer/the olefin-based elastomer) =9:1 to 3:7, and the resin composition comprises 15 to 100 parts by mass of an oil based on 100 parts by mass of the styrene block-hydrogenated conjugated diene compound block copolymer.

9. The molded article for the automotive lamp extension according to claim 8, wherein the elastomer component (C) comprises an oil-extended styrene block-hydrogenated conjugated diene compound block copolymer.

* * * * *